July 8, 1930.　　　　W. CONLAN　　　　1,770,152
SWING HANGER
Filed Aug. 6, 1929
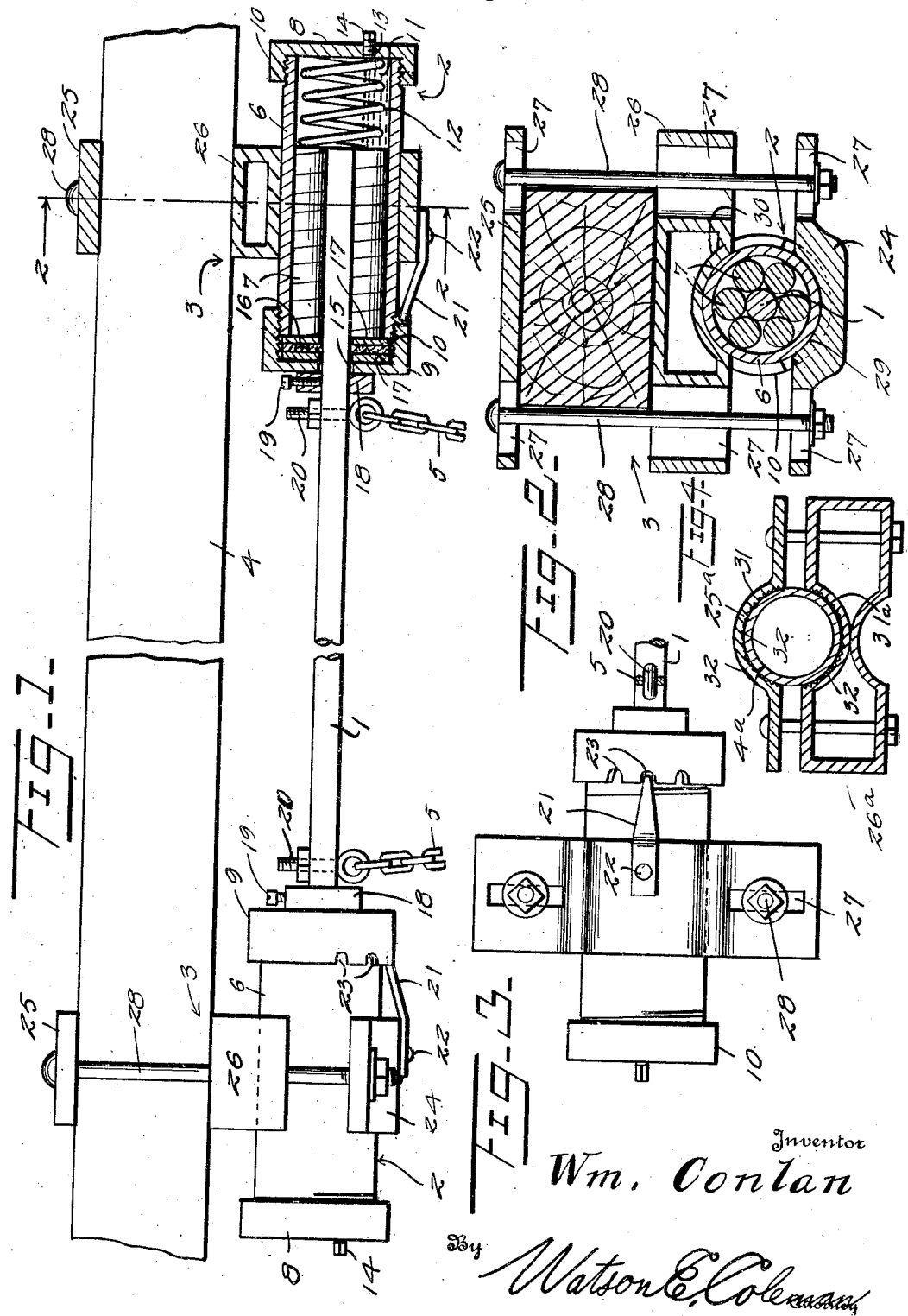
Inventor
Wm. Conlan
By Watson E. Coleman Patented July 8, 1930

1,770,152

UNITED STATES PATENT OFFICE

WILLIAM CONLAN, OF QUINCY, WASHINGTON

SWING HANGER

Application filed August 6, 1929. Serial No. 383,942.

This invention relates to a hanger especially adapted for use in connection with swings and embodying a shaft to which the seat suspending elements are connected, bearings for the shaft, and clamps for securing the bearings to a beam or other support.

The invention has for one of its objects to provide a hanger of the character stated wherein the end portions of the shaft shall be journaled in the bearings and wherein the seat suspending elements shall be connected to the shaft at points between and close to the bearings, whereby to reduce to the minimum the tendency of the shaft to turn about a vertical axis and a horizontal axis transversely thereof while the swing is in use, and thus insure the free turning or rocking of the shaft.

The invention has for a further object to provide a hanger of the character stated wherein the bearings shall be equipped with rollers of such length as to provide a substantial anti-friction support for the end portions of the shaft.

The invention has for a further object to provide a hanger of the character stated, wherein the boxings of the bearings shall be of greater length than the rollers so as to provide reservoirs adapted to contain sufficient lubricant to maintain the bearings in a well oiled condition for a long time.

The invention has for a further object to provide a hanger of the character stated wherein the clamps shall be of such construction as to permit them to be readily connected to the support, wherein the clamps shall be adapted to engage the support in a manner to prevent them from having any turning movement with respect thereto, and wherein the support shall be adapted to hold the bearings against any turning movement with respect thereto.

The invention has for a still further object to provide a hanger of the character stated wherein the several parts thereof shall be strong and durable and capable of being readily assembled and manufactured at a low cost.

The invention is hereinafter fully described and claimed and illustrated in the accompanying drawing, wherein:—

Figure 1 is a view partly in elevation and partly in vertical section of the swing hanger, the hanger being shown connected to its support;

Figure 2 is a sectional view taken on the vertical plane indicated by the line 2—2 of Figure 1;

Figure 3 is a bottom plan view of one of the clamps, one of the bearings, and a portion of the shaft of the hanger; and Figure 4 is a sectional view of a slightly modified form of the hanger clamps.

Referring in detail to the drawing, 1 designates the shaft, 2 the bearings, and 3 the camps of the hanger, all of which parts are made of metal. 4 designates the beam or support to which the hanger is secured, and 5 seat suspending elements which may be in the form of chains, metal cables, ropes or the like.

The bearings 2 comprise cylindrical boxings 6 within which the end portions of the shaft 1 are arranged, and long anti-friction rollers 7 which surround the end portions of the shaft. The boxings 6 are provided with outer heads 8 and inner heads 9 which are screw threadedly engaged, as at 10, with the end portions of the boxings. The boxings 6 are longer than the rollers 7 and the rollers are spaced from the outer heads 8 so as to provide lubricant chambers or reservoirs 11 which are in full communication with those portions of the boxings in which the rollers are arranged so as to effect the efficient lubrication of the rollers and the end portions of the shaft 1. The rollers 7 are held against endwise displacement into the reservoirs 11 by coil springs 12 which are arranged within the boxings 6 between the outer heads 8 and the outer ends of the rollers and which are always under sufficient tension to prevent the displacement of the rollers. To permit the reservoirs 11 to be supplied with lubricant, the outer heads 8 are provided with openings 13 which are closed by plugs 14 and located slightly below the shaft 1 so as to prevent the reservoirs from being supplied with more than a predetermined amount of lubricant.

The inner heads 9 are provided with central openings 15 for the reception of the shaft 1, and felt washers 16 are provided for the purpose of preventing the lubricant from escaping from the boxings 6 by way of these openings. The felt washers 16 are each arranged between metallic washers 17 which are in turn mounted between the inner ends of the boxings 6 and the inner heads 9, all of the washers being slightly smaller than the outer diameter of the boxings 6 so as to permit the easy application of the inner heads 9.

The shaft 1 is held against endwise movement with respect to the bearings 2 by collars 18 which contact with the inner heads 9 and are secured to the shaft by set screws 19. The seat suspending elements 5 are secured to the shaft 1 at points close to the inner ends of the bearings 2 by eye bolts 20. In order to prevent the rocking of the shaft 1 and its collars 18 from imparting any turning movement to the inner heads 9, these heads are secured in place by spring latches 21 which are secured to the clamps 3, as at 22, and are removably engaged with selected notches 23 in the annular walls of the heads.

The clamps 3 comprise lower members 24, upper members 25 and intermediate members 26. The clamp members 24 are arranged at the lower sides of the boxings 6, the clamp members 26 are arranged at the upper sides of the boxings and contact with the lower side of the beam or support 4, and the clamp members 25 are arranged at the upper side of the beam or support. The clamp members 24, 25 and 26 are provided with slots 27 for the passage of bolts 28 which secure the clamp members in assembled relation with respect to the boxings 6 and the beam or support 4. The slots 27 extend in the direction of the length of the clamp members 24, 25 and 26, and are of considerable length in order to permit the application of the clamps to a beam or support of any thickness. The clamp members 24 are provided in their upper sides with arcuate recesses 29 for the reception of the lower sides of the boxings 6, and these clamp members are welded or secured to the boxings in any other suitable manner. The clamp members 26 are of hollow formation, and are provided in their lower sides with arcuate recesses 30 for the reception of the upper sides of the boxings 6.

The clamps 3 are adapted to secure the bearings 2 to a beam or support of angular formation in cross section. When the beam or support is in the form of a rod or tube, the clamps 3 are provided with upper and intermediate members of the construction shown in Figure 4. These upper and intermediate clamp members 25$^a$ and 26$^a$ differ from the corresponding parts of the clamp shown in Figures 1 to 3 in that they are provided with arcuate portions 31 and 31$^a$, respectively, for the reception of the round support 4$^a$. The clamp members 25$^a$ and 26$^a$ are provided in the opposing sides of their arcuate portions with teeth 32 which engage the support 4$^a$ and hold the clamps against turning movement on the support.

It should be apparent from the foregoing description, taken in connection with the accompanying drawing, that the shaft 1, bearings 2 and clamps 3 may be easily and quickly assembled and that the clamps may be easily and quickly secured to a beam or other support. It will also be apparent that the clamps 3 are held against movement with respect to the support; that the bearings 2 are held against movement with respect to the clamps; and that while the shaft 1 is held against endwise movement with respect to the bearings, it is capable of free rotation therein. It will be also understood that the shaft 1 and rollers 7 are amply lubricated, and that as the seat suspending elements 5 are secured to the shaft at points close to the bearings 2 the shaft will be held against any movement in a direction which would tend to interfere with its turning freely in the bearings.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A swing hanger comprising boxings arranged in relatively spaced relation, antifriction rollers arranged in the boxings and terminating short of the outer ends thereof to provide lubricant reservoirs, springs arranged within the reservoirs and contacting with the outer ends of the boxings and with the outer ends of the rollers, and a shaft having its ends arranged between the rollers.

2. A swing hanger comprising cylindrical boxings having removable heads and arranged in relatively spaced relation, the inner heads being provided with central openings, a shaft having its end portions extending through said openings into the boxings, rollers arranged within the boxings about the ends of the shaft and terminating short of the outer ends of the boxings to provide lubricant reservoirs, springs arranged between the outer heads and rollers, and means arranged between the boxings and the inner heads to prevent the lubricant from passing through the openings in said heads.

3. A swing hanger comprising boxings having inner heads screw threadedly engaged therewith and provided with central openings, a shaft having its end portions passing through said openings and into the boxings, rollers arranged within the boxings about the end portions of the shaft, collars secured to the shaft and contacting with the heads, and spring elements engaging the heads to prevent them from being turned during the movement of the shaft and collars.

4. A swing hanger comprising bearings, a shaft having its end portions journaled in the bearings, clamp members secured to the lower sides of the bearings, support engaging clamp members arranged above the bearings and provided in their inner sides with support receiving recesses, the inner faces of the recesses being provided with support engaging teeth, and bolts passing through the clamping members.

5. A swing hanger comprising bearings, a shaft having its end portions arranged in the bearings, clamp members secured to the lower sides of the bearings, support engaging clamp members arranged above the bearings, said clamp members being provided with longitudinally extending slots and bolts passing through the slots.

In testimony whereof I hereunto affix my signature.

WILLIAM CONLAN.